United States Patent Office 2,738,343
Patented Mar. 13, 1956

2,738,343

COPOLYMER OF TRIFLUOROCHLOROETHYLENE AND VINYLIDENE FLUORIDE

Albert L. Dittman, Jersey City, Herbert J. Passino, Englewood, and Wilber O. Teeters, River Edge, N. J., assignors to The M. W. Kellogg Company, Jersey City, N. J., a corporation of Delaware No Drawing. Application February 28, 1951, Serial No. 213,298

8 Claims. (Cl. 260—87.7)

This invention relates to polymers containing halogen. In one aspect the invention relates to a halogen-containing copolymer. In a still more particular aspect the invention relates to the manufacture and application of a copolymer of trifluorochloroethylene and vinylidene fluoride.

Halogen-containing polymers and copolymers constitute a relatively new field of chemistry. These halogen-containing polymers contain a relatively high proportion of halogens, such as fluorine, chlorine and bromine. The polymers containing fluorine are relatively inert and have good physical and chemical stability. One of the most useful polymers of this field is a halocarbon homopolymer of trifluorochloroethylene. This particular polymer of trifluorochloroethylene has been developed to a stage where it is now commercially available and has many useful applications because of its chemical inertness and when in the form of a plastic has high physical strength and resilience. Four-fifths of the weight of polytrifluorochloroethylene is made up of fluorine and chlorine. The plastic form of polytrifluorochloroethylene is colorless and transparent. The polymer, including the oil, wax and plastic forms, has a high chemical stability with no effect being observed on the polymer after prolonged exposure to concentrated sulfuric acid, hydrochloric acid and hydrofluoric acid. In addition, no effect is observed on the polymer after prolonged exposure to strong caustic solutions, fuming nitric acid, aqua regia, and other vigorous oxidizing materials. The plastic form of the above polymer is flexible and resilient, is not affected by water, is unaffected by high humidity and, in general, is an efficient insulating material.

In the course of study and application of the plastic homopolymer of trifluorochloroethylene, it has been found essential to maintain the polymer at a relatively high molecular weight in order to avoid embrittlement of the polymer on heat ageing. These observations are particularly applicable to instances in which the plastic polymer is applied as coatings or films on surfaces which are subjected to elevated temperatures. In the case of electrical motors in which the electrical wiring, such as the armature of the motor, is coated with the plastic form of the homopolymer as an insulating material, the plastic polymer must be applied to the wire in the form of a high molecular weight polymer corresponding to an N. S. T. greater than 300° C. in order to avoid embrittlement. Since the plastic polymer of trifluorochloroethylene is difficult to melt and apply as a liquid in a high molecular weight form, it has been applied in the form of a dispersion in a suitable organic or aqueous dispersing medium. It has been found that with dispersions of the high molecular weight polymers of trifluorochloroethylene, relatively long periods of time are necessary to permit the dispersed particles to flow to a continuous protective film on the surface, such as wire, because of the slow rate of flow of the homopolymer. Further, it has been found that in applying the dispersion temperatures in excess of 250° C. have caused rapid degradation of the high molecular weight polymer, this temperature being employed to fuse or sinter the particles of plastic to a continuous film. As a result, resort has been made to the use of relatively lower temperatures than the above and longer periods of time for effecting the fusion or sintering operation in the application of the dispersed polymer on the surface.

This difficulty in applying the dispersion of plastic polytrifluorochloroethylene at high temperatures makes it of questionable value for commercial application, in particular to wire coatings of motors, because of the long time cycle required for the fusion operation and its tendency to decompose at the fusion temperature.

Another disadvantage of the homopolymer of trifluorochloroethylene is that it loses its adhesion and flexibility to some extent when heat aged. In part, this loss of adhesion and flexibility during heat ageing may be due to the relatively high temperatures necessary during fusion of the homopolymer. The lack of flexibility observed during heat ageing is apparent by the brittleness and cracking of the homopolymer when flexed. It has been found that, if the homopolymer of trifluorochloroethylene is degraded below about 285° C. N. S. T. during application to the surface, the homopolymer will become brittle on heat ageing at 190° C. Loss of flexibility is even observed with plasticized samples of the homopolymer of trifluorochloroethylene.

Normally solid polymers produced from the single monomer trifluorochloroethylene may be prepared by polymerizing the monomer in the presence of a suitable organic peroxide, such as trichloroacetyl peroxide, as the polymerizing agent, at a temperature between about —20° C. and about 30° C., preferably at a temperature of about —16° C. At a temperature of —16° C., the polymerization of trifluorochloroethylene to a satisfactory yield of solid polymer is accomplished in about 150–170 hours. At elevated temperatures and at corresponding superatmospheric pressures less time is required to complete the polymerization. As this invention does not reside in the preparation of the homopolymer per se, further discussion thereof is deemed unnecessary.

To distinguish a plastic polymer over the corresponding oil and wax produced with the same monomer, the plastic polymer is described herein by reference to its no strength temperature. A no strength temperature (N. S. T.) of between about 210° C. and about 350° C. is characteristic of a normally solid polymer having thermoplastic characteristics. Best plastic characteristics of the normally solid polymer are observed at N. S. T. values between about 240° C. and about 340° C. The N. S. T. values of the polymer depend upon the conditions employed during polymerization, such as temperature, residence time, concentration of promoter, and pressure being of primary importance.

The no strength temperature (N. S. T.) is determined in the following manner: A sample of polymer, such as polytrifluorochloroethylene, is hot pressed into a $\frac{1}{16}''$ thick sheet and cut into a strip of $\frac{1}{8}'' \times \frac{1}{16}'' \times 1\frac{5}{8}''$. The strip is notched $\frac{5}{8}''$ from the top so that the dimension at the notch is $\frac{1}{16}'' \times \frac{1}{16}''$. A fine wire and a standard weight is attached to one end of the strip. The weight of the polymer plus the wire and standard weight is equal ½ grams. The strip is then attached in a furnace and fixed vertically therein. The temperature of the sample is increased at a rate of 1½° C. per minute in the furnace as the breaking temperature is approached. The no strength temperature is the breaking temperature of the sample. Differences of about 5° C. are considered significant.

It is an object of this invention to provide a polymer which has similar physical and chemical characteristics to the homopolymer of trifluorochloroethylene but which can be applied readily and conveniently to surfaces at high temperatures without degradation and short times of fusion.

Another object of this invention is to provide a polymer which is not subject to embrittlement of the film when it is placed in service at high temperatures, for example at temperatures of 100° C. to 200° C.

Another object of this invention is to provide a dispersion, and a method for producing same, of a polymer which can be applied to obtain a glossy, smooth film with a minimum temperature-time cycle.

Still a further object of this invention is to provide a method for producing a polymer of the above characteristics.

Still another object of this invention is to provide a particular novel polymer composition containing fluorine.

Various other objects and advantages of the present invention will become apparent to those skilled in the art.

The polymer of the present invention is specifically a thermoplastic copolymer prepared from the monomers consisting of trifluorochloroethylene and vinylidene fluoride in proportions of more than 90 mol per cent (approximately 95 weight per cent) trifluorochloroethylene and less than 10 mol per cent (approximately 5 weight per cent) vinylidene fluoride. It is preferred to employ a minimum amount of 0.1 mol per cent (approximately 0.05 weight per cent) of vinylidene fluoride. The ultimate composition of the copolymer produced with the above percentages of monomers is within a similar range of composition containing more than 90 mol per cent material corresponding to the monomer, trifluorochloroethylene, and less than 10 mol per cent of the monomer, vinylidene fluoride. With relatively high conversions of monomer during polymerization of at least 50 per cent, the copolymer product corresponds in composition substantially to the same percentage as the monomers charged to the polymerization reactor. For low conversions, the percentage of vinylidene fluoride in the copolymer product may be as much as twice the percentage of vinylidene fluoride charged to the polymerization reaction.

Higher percentages of vinylidene fluoride than about 10 mol per cent (5 weight per cent) are not suitable for producing a copolymer effective for coating surfaces, such as wires for electric motors, because of the relatively low molecular weight of the copolymer produced and its tendency to degrade upon heating. A maximum of 10 mol per cent of vinylidene fluoride in the copolymer has been found to be critical in the above respects. The preferred composition of the copolymer contains between about 0.5 and about 6 mol per cent of vinylidene fluoride and best results have been observed with a copolymer containing between about 1 and about 4 mol per cent of vinylidene fluoride. The copolymer containing 2 to 4 mol per cent of vinylidene fluoride exhibits ideal flow characteristics at fusion temperatures of application of about 200° C. to 250° C. with a minimum amount of time required for its application. This particular copolymer, also, is characterized by its high gloss and smoothness of final film with negligible embrittlement, even with copolymers possessing an N. S. T. lower than 250° C. The above copolymer exhibits substantially all of the chemical and physical properties of the homopolymer of trifluorochloroethylene as to chemical stability, swelling by solvents weight, weight loss due to heat ageing and electrical properties.

In the preparation of the plastic copolymer of trifluorochloroethylene and vinylidene fluoride, the monomers are mixed and maintained at a temperature between about −20° C. and about 30 or 40° C. for a period of time between about 30 minutes and about 12 days depending upon such factors as the particular temperature and promoter employed. These plastic copolymers produced in the above manner have an N. S. T. value above about 210° C. and usually not higher than about 350° C. The preferred temperature of polymerization is between about −17° C. and about 20° C. or 30° C. employing a suitable promoter.

In general, organic peroxide promoters, such as the halogen substituted acetyl peroxides, are employed when the copolymer is prepared in the absence of a suspension agent. Trichloroacetyl peroxide is the preferred promoter in this instance. Various other halogen substituted organic peroxides, such as trifluoroacetyl peroxide, difluorochloroacetyl peroxide, 2,4-dichlorobenzoyl peroxide, chloroacetyl peroxide, trifluorodichloropropionyl peroxide and dichlorofluoroacetyl peroxide are also suitable for promoting the copolymerization.

The polymerization may be effected with a suspension agent, such as water, or an organic liquid, such as hydrocarbon oils, without departing from the scope of this invention. These suspension agents are diluents in which the monomers and copolymer are suspended during polymerization and serve to withdraw heat from the polymerization. In the case of the suspension or emulsion technique of polymerizing, particularly in the case of water emulsion polymerization, the preferred promoters include the inorganic promoters, such as the persulfates, perborates, peroxides and perphosphates. Of these, potassium persulfate is preferred. The weight ratio of suspension agent or diluent to total monomer is between about 0.05 to about 10. Also, in employing the suspension type of polymerization relatively higher temperatures above the freezing point of the reaction mixture are employed, preferably temperatures between about 0° C. and about 30° C. or 40° C.

The concentration of promoter in the polymerization mixture varies over a considerable range but, generally, is within the range of between about 0.01 to about 5 weight per cent based on total monomer in the reactor. The concentration will vary depending upon the ultimate N. S. T. value of the polymer desired and upon the method of polymerization employed. For example, for the highest N. S. T. product, the minimum amount of promoter is preferable. Also, in a continuous process in which the concentration of the promoter may be maintained relatively constant within narrow limits, the concentration of the promoter in the reaction zone will, therefore, correspond substantially at all times to the preferred composition for the particular product being produced. On the other hand in batch or bulk polymerization, excess promoter is employed initially, which concentration decreases by consumption during polymerization.

Various activators, and accelerators may be employed in conjunction with the promoter without departing from the scope of this invention. These activators are particularly useful in the suspension type of technique of polymerization when water is used as the suspension agent. Sodium bisulfate is an example of a suitable activator in aqueous emulsion polymerization. An example of a suitable accelerator is the ferrous ion. The polymerization may also be effected in the presence of fillers or coloring agents, such as carbon black, titanium dioxide, asbestos, etc., without departing from the scope of this invention.

In bulk polymerization in which the polymerization is permitted to proceed until the monomers are converted to the desired plastic, the form of the product is a porous solid plug containing unreacted monomers in the interstices of the solid plug of polymer. In another type of polymerization in which the polymer is permitted to form a slurry in a mass of liquid reaction medium, the polymer is recovered as finely-divided particles from the slurry by filtration or other conventional means. This is particularly the case in aqueous suspension polymerization, but is not confined to that type of polymerization since the monomers themselves, in the liquid state may constitute the suspension agent.

After the polymer has been recovered it is usually treated to remove unreacted monomer by vaporization and then the recovered polymer, if not already in the form of finely-divided particles, is broken up into smaller fragments for further handling.

The application of the copolymer to the surface is usually effected by applying a dispersion of the copolymer to the surface and in evaporating the dispersion medium followed by fusion or sintering of the particles of copolymer on the surface to form a continuous uniform film. In preparation of the dispersion, the polymer must be ground to a relatively small size. This may be accomplished initially by grinding the fragments of solid plastic polymer to a size less than about 40 mesh. After which pulverization, the polymer and dispersing medium are admixed and the polymer further ground in a ball mill, or like conventional means, to a particle size of from about 0.1 to about 10 microns. The concentration of the copolymer in the dispersion is usually between about 10 and about 30 per cent.

It is often difficult to obtain initially a high concentration of copolymer in the dispersing medium. Higher concentrations than can be initially obtained may be obtained by grinding or pulverizing the copolymer in the presence of the dispersing medium to the maximum concentration obtainable without substantial settling. Thereafter, the slurry or dispersion of copolymer is permitted to settle over a period of several days to increase the concentration. The supernatant liquid is decanted from the settled mixture, thereby obtaining an ultimate dispersion of increased concentration of copolymer. When the copolymer is in the finely-divided form between about 0.1 and about 10 microns it will not completely settle from the dispersing medium.

Various dispersing mediums may be employed in dispersing the copolymer of this invention for application to surfaces. Such dispersing medium usually comprises a dispersing agent and a diluent. Suitable dispersing agents comprise the aliphatic and aromatic esters, the ether alcohols, and the ketones. Typical examples of the dispersing agents are: di-isobutyl ketone, methyl isobutyl ketone, cyclohexanone, methoxy ethanol, ethoxy ethanol, ethoxy ethoxy ethanol, methyl acetate, butyl acetate and ethyl benzoate.

Although the dispersion may be prepared without the use of a diluent; that is, with the dispersing agent alone, a diluent is preferred. Such diluents comprise the aromatic hydrocarbons, such as xylene, toluene, or benzene; hydrocarbon oil fractions containing relatively large amounts of aromatic hydrocarbons, aliphatic alcohols, unsubstituted ethers, such as dibutyl ether, and water. In using water as a diluent, it is prefrred to employ acetone as a dispersing agent and butanol as a wetting agent.

Plasticizers may be incorporated with the dispersion. Such plasticizers are the fluorochlorocarbon oils and waxes. These plasticizers are incorporated with the mixture before or after ball milling during the preparation of the dispersion. The plasticizers are incorporated in the dispersing medium in similar amounts as the concentration of the plastic copolymer, the exact amount depending upon the amount of plasticization desired. The plasticizer may be incorporated during polymerization without departing from the scope of this invention.

Surfaces may be coated by dipping the surface of the article into the dispersion followed by fusion or sintering. A coating of not more than about two mils in thickness can be obtained by a single dip. Usually two or more dips with fusion between dips are required to obtain the desired thickness of uniform film upon the surface of the article. After each dip the surface containing the deposited plastic thereon is fused or sintered by heating to a temperature of at least 225° C., but usually not higher than about 250° C., for a period of time between 30 seconds and 25 minutes. When using a plasticizer, temperatures as low as 200° C. may be employed. The shorter periods of time within the above range are used with the higher temperatures of fusion. The lower temperatures of fusion are preferred since the tendency of the polymer to decompose and attack metal surfaces is minimized. The procedure of dipping and fusing may be repeated until the desired film thickness is obtained. Other methods of application of films upon surfaces include spraying and painting. On rigid metal surfaces, it may be desirable to lower the temperature following fusion at a slow rate, giving better adhesion. On the other hand, when flexibility and toughness are required, a quick quench of the fused film, for example in water, will be necessary to obtain an essentially amorphous polymer.

Another method of applying the plastic copolymer of this invention to surfaces includes dissolving the copolymer in a suitable solvent and evaporating the solvent after application of the solution to the surface to be coated. If insufficient thickness is obtained after one application of the solution, the procedure may be repeated until a sufficient film thickness is obtained.

The copolymer is soluble in only a limited number of solvents. The preferred solvents are the fluorochlorocarbons, such as a perfluorochlorobutane.

The following examples are offered as a better understanding of the present invention, and are not to be construed as unnecessarily limiting to the invention. These examples show comparative tests between the homopolymer of trifluorochloroethylene and the copolymer of trifluorochloroethylene and vinylidene fluoride. The examples, also, show methods of preparation of the copolymer of this invention and the method of preparation of dispersions.

EXAMPLE I

Several copolymerization runs were carried out using about 2 mol per cent vinylidene fluoride and about 98 mol per cent trifluorochloroethylene. These runs were made in glass reaction tubes in accordance with the operating conditions shown in Table I below. The yield and N. S. T. value of the product is also shown in Table I. The copolymer was recovered by evaporating unreacted monomers from the final reaction mixture. The copolymer was a white solid core in appearance, and in general had the appearance and physical properties similar to the homopolymer of trifluorochloroethylene. The copolymer of the various runs contained from 2 to 4 mol per cent vinylidene fluoride, the low percentages at high conversions and the high percentages at low conversions.

Table I

| Run No. | Mole Percent $CCl_3COO_2$ | Time | Bath Temp., °C. | Wt. Percent Polymer | N. S. T., °C. |
|---|---|---|---|---|---|
| 1 | 0.0358 | 24 hrs | 0 | 15.4 | 227 |
| 2 | 0.0178 | 24 hrs | 0 | 11.4 | 246 |
| 3 | 0.00895 | 24 hrs | 0 | 7.5 | 264 |
| 4 | 0.00268 | 168 hrs | −16 | 37.9 | 322 |
| 5 | 0.00268 | 12 days | −15 | 56 | 340 |

The copolymerization of run No. 5 which was carried out for 12 days resulted in a polymer of a higher density core than the other polymerization runs. The core was extremely difficult to grind and the polymer did not exhibit the ease of flow when heated to fusion temperature as did the other copolymers of the other runs made by shorter periods of copolymerization. The fusion temperature of this copolymer was very high.

EXAMPLE II

A sample of copolymer of vinylidene fluoride (2 mole per cent) and trifluorochloroethylene (98 mole per cent) was prepared for charging to the pebble mill by a method similar to the preparation of polytrifluorochloroethylene powder. While polytrifluorochloroethylene dispersions are prepared normally by milling for 65 hours in the presence of the dispersion medium, the copolymer resulted in an acceptable dispersion after 24.5 hours milling. Diisobutyl ketone and xylene were used as the dispersing medium.

The copolymer dispersion was concentrated above 20 per cent solids by settling and decantation of the supernatant liquid. The copolymer dispersion contained 25 weight per cent solids and was as fluid (by visual observation) as a polytrifluorochloroethylene dispersion at 20 per cent solids and deposited fused films of 1.0 to 1.5 mils as compared to fused films of 0.5 mil of polytrifluorochloroethylene. A fusion temperature range between 225° C. to 250° C. was established.

A plasticizer (polytrifluorochloroethylene wax) was incorporated with the dispersion of the copolymer above. The required fusion temperature for the plasticized copolymer was substantially lower than that required for plasticized polytrifluorochloroethylene, the fusion temperature being about 175° C. to 200° C.

Films deposited from the copolymer dispersions, both plasticized and unplasticized, are much more transparent than those deposited from corresponding films of polytrifluorochloroethylene thermoplastic.

EXAMPLE III

Nickel plated copper wire, nickel coating calculated to be 3.5 x $10^{-5}$ inch, and aluminum wire were coated with various high N. S. T. polytrifluorochloroethylene dispersions and trifluorochloroethylene-vinylidene fluoride copolymer dispersion of 280 to 290 N. S. T. at fusion temperatures and times (Table II) which would not degrade the polymer. The copper wire was about 90 per cent covered with nickel. The coated wires were then heat aged at 190° C. The results of ageing tests are summarized in Table II. The mandril test of Tables II and III involved heat ageing 5" x 3/8" x 1/16" polymer strips and after heat ageing the strips are subjected to reverse bends over a 3/8" mandril. Thirty bends without breaking is considered passing.

Table II

HEAT AGEING AT 190° C. HOMOPOLYMER AND COPOLYMER INSULATIONS ON ALUMINUM WIRE AND NICKEL PLATED COPPER WIRE

| Dispersion | NST | Solution Viscosity (Centistokes) | Wire | No. of Coats | Fusion Temp. (°C.) | Fusion Time (Hr.) | Build (Addn. to Dia., Mil) | Mandril Test Hours at 190° C. 145 | 564 | 729 | 784 |
|---|---|---|---|---|---|---|---|---|---|---|---|
| NW-25 [1] | 322 | 2.67 | Aluminum | 5 | 225-240 | 2.5 | 3-4 | | | Pass. | Fail; Film brittle. |
| NW-25 | 322 | 2.67 | Nickel Plated Copper. | 6 | 225 | 3.5 | 3-5 | Pass | Fail | | |
| NW-25 | 315 | 2.48 | Aluminum | 5 | 225-240 | 4.0 | 3-5 | | Fail; Many striae. | Pass. | Do. |
| NW-25 | 315 | 2.48 | Nickel Plated Copper. | 7 | 225 | 2.75 | 3-4 | Pass | | | |
| NI [2] | 313 | 2.43 | Aluminum | 5 | 225 | 6.0 | 3-5 | | Pass | Pass. | Do. |
| NW-25 | 313 | 2.43 | Nickel Plated Copper. | 3 | 240 | 3.25 | 2-3 | Pass | Fail; Many striae. | | |
| NW-25, Copolymer 2 mol percent Vinylidene Fluoride. | 290 | | Aluminum | 3 | 225-240 | 1.5 | 5-5.5 | | | Pass. | |
| Do. | 290 | | Nickel Plated Copper. | 4 | 225 | 1.25 | 3-5 | Pass | Pass | | Do. |
| NI, Copolymer 2 mol percent Vinylidene Fluoride. | 290 | | Aluminum | 5 | 225-240 | 2.25 | 3-3.5 | | | Pass. | |

[1] NW-25—20 wt. percent plastic, 6.7% plasticizer, 73.3% dispersion medium (80% xylene, 20% di-isobutyl ketone).
[2] NI—20 wt. percent plastic, 80 wt. percent dispersion medium (80 wt. percent xylene, 20 wt. percent di-isobutyl ketone).

The data show that, oxidation of the nickel plated copper wire together with the formation of a brittle oxide which easily flakes off the wire, contributed some to the embrittlement of the polytrifluorochloroethylene coating. The formation of loose oxide scale on the nickel plated copper wire indicated that heavier nickel coatings should be used on copper wire.

The coatings obtained on both aluminum and nickel plated copper wire from the plasticized copolymer were fused to a high glaze at a relative short time as indicated by Table II. Plasticized polytrifluorochloroethylene coatings have to be heated several hours longer at 225–240° C. to obtain the same glaze. Even so, the polytrifluorochloroethylene coating is not as smooth as the copolymer coating.

EXAMPLE IV

Relative crystallinities of samples of plastic homopolymers of trifluorochloroethylene and copolymers of trifluorochloroethylene and 2 mol per cent vinylidene fluoride were determined with an X-ray diffraction Geiger counter spectrometer. These tests were carried out on $\frac{1}{16}$ inch pressed sheets, heat aged for times and temperatures indicated in Tables III and IV.

Table III
HEAT AGING vs. EMBRITTLEMENT 190° C.

| Material | Mandril Test | | |
|---|---|---|---|
| | 15 Days | 30 Days | 90 Days |
| 307 N. S. T. Homopolymer | Passed | Passed | Passed. |
| 300 N. S. T. Homopolymer | ----do---- | ----do---- | Do. |
| 284 N. S. T. Homopolymer | Partial Failure | Failed 1 Bend. | Failed 1 Bend. |
| 264 N. S. T. Homopolymer | ----do---- | ----do---- | Do. |
| 322 N. S. T. Copolymer (2 mol percent vinylidene fluoride). | Passed | Passed | Passed. |
| 290 N. S. T. Copolymer | ----do---- | ----do---- | Do. |
| 264 N. S. T. Copolymer | ----do---- | ----do---- | Do. |
| 246 N. S. T. Copolymer | ----do---- | ----do---- | Do. |
| 226 N. S. T. Copolymer | ----do---- | ----do---- | Do. |

From these tests it was concluded that the lowest N. S. T. samples of both polymer and copolymer possessed the highest crystallinity. The crystallinities of the homopolymer and copolymer were of the same order up to about two months heating period. At the end of two months the copolymers exhibited lower crystallinity than the homopolymer. The crystallinity of the homopolymer increased with time of exposure. Although 225° C. N. S. T. copolymer exhibits considerable crystallinity on heat aging, the copolymer was not brittle.

Table IV
HEAT AGING vs. PERCENT WEIGHT LOSS ON POLYMER

| | Homopolymer | | Copolymer, 2 mol percent Vinylidene Fluoride |
|---|---|---|---|
| | 317 N. S. T. | 284 N. S. T. | |
| 260° C.: | | | |
| 25 hr | 0.2 | 0.1 | 0.3 |
| 92 hr | 0.4 | 0.1 | 0.8 |
| 309 hr | 1.3 | 0.6 | 2.8 |
| 427 hr | 2.5 | 1.5 | 3.9 |
| 596 hr | 5.1 | 3.1 | 6.0 |
| 694 hr | 5.5 | 3.4 | 6.7 |
| 790 hr | 6.0 | 3.8 | 7.1 |
| 225° C.: | | | |
| 493 hr | 0.1 | | 0.3 |
| 929 hr | 0.1 | | 0.4 |
| 190° C.: | | | |
| 495 hr | 0.03 | | 0.3 |
| 1092 hr | 0.03 | | 0.3 |

EXAMPLE V

Various copolymer compositions of trifluorochlorethylene containing 1, 2, 3, 4, 5, 34.4 and 56.5 mol per cent vinylidene fluoride were prepared and tested. These tests indicated that as the vinylidene fluoride composition of copolymer increases the copolymer becomes more rubbery and softer. Copolymers less than 10 mol per cent of vinylidene fluoride resembled most closely the homopolymer of trifluorochloroethylene in toughness and flexibility. It is believed that, in polymerization, the monomers of the copolymer alternate in the polymer chain.

The following tables are a comparison of the characteristics of the copolymer employing various amounts of vinylidene fluoride and a homopolymer of trifluorochloroethylene, prepared under similar conditions. Increasing the percentage of vinylidene fluoride in the copolymer increases the solubility of the copolymer and decreases its heat resistance.

The samples containing 1, 2, 3, 4, 5, 34.4 and 56.5 mol per cent vinylidene fluoride were pressed at 500° F. Those containing from 1–5% inclusive resembled the homopolymer, but were more transparent. Those containing 34.4% and 56.5% were rubber-like.

Table V
PERCENT WEIGHT LOSS AT 260° C.

| Hours | 65.6% $CFCl=CF_2$ 34.4% $CH_2=CF_2$ | 43.5% $CFCl=CF_2$ 56.5% $CH_2=CF_2$ | Homopolymer |
|---|---|---|---|
| 67 | 11.41 | 7.24 | 0.15 |
| 93 | 17.43 | 9.70 | 0.19 |
| 141 | 26.65 | 13.33 | 0.33 |

These copolymers containing high percentages of vinylidene fluoride are much more heat sensitive than the homopolymer.

Table VI
PERCENT WEIGHT LOSS AT 225° C.

| Hours | 99.0% $CFCl=CF_2$ 1.0% $CH_2=CF_2$ | 98.0% $CFCl=CF_2$ 2.0% $CH_2=CF_2$ | 97.0% $CFCl=CF_2$ 3.0% $CH_2=CF_2$ | 96.0% $CFCl=CF_2$ 4.0% $CH_2=CF_2$ |
|---|---|---|---|---|
| 282 | 0.29 | 0.30 | 0.29 | 0.26 |
| 330 | 0.29 | 0.30 | 0.31 | 0.26 |
| 424 | 0.29 | 0.32 | 0.31 | 0.26 |
| 493 | 0.29 | 0.34 | 0.33 | 0.29 |
| 617 | 0.29 | 0.34 | 0.35 | 0.31 |
| 929 | 0.29 | 0.37 | 0.40 | 0.44 |

| Hours | 95.0% $CFCl=CF_2$ 5.0% $CH_2=CF_2$ | 65.6% $CFCl=CF_2$ 34.4% $CH_2=CF_2$ | 43.5% $CFCl=CF_2$ 56.5% $CH_2=CF_2$ | Homopolymer |
|---|---|---|---|---|
| 282 | 0.28 | 3.74 | 0.37 | 0.07 |
| 330 | 0.28 | 4.54 | 0.43 | 0.08 |
| 424 | 0.28 | 6.05 | 0.53 | 0.09 |
| 493 | 0.29 | 7.36 | 0.62 | 0.09 |
| 617 | 0.33 | 10.6 | 0.89 | 0.09 |
| 929 | 0.50 | 19.0 | 3.55 | 0.09 |

Low percentages of vinylidene fluoride in copolymer did not affect heat stability in comparison with the homopolymer.

Table VII
PERCENT WEIGHT LOSS AT 190° C.

| Hours | 99.0% CFCl=CF$_2$ 1.0% CH$_2$=CF$_2$ | 98.0% CFCl=CF$_2$ 2.0% CH$_2$=CF$_2$ | 97.0% CFCl=CF$_2$ 3.0% CH$_2$=CF$_2$ | 96.0% CFCl=CF$_2$ 4.0% CH$_2$=CF$_2$ |
|---|---|---|---|---|
| 70 | 0.26 | 0.22 | 0.26 | 0.21 |
| 140 | 0.26 | 0.26 | 0.26 | 0.21 |
| 447 | 0.29 | 0.28 | 0.28 | 0.24 |
| 495 | 0.30 | 0.28 | 0.29 | 0.24 |
| 567 | 0.31 | 0.29 | 0.29 | 0.24 |
| 638 | 0.31 | 0.29 | 0.29 | 0.24 |
| 1,092 | 0.32 | 0.29 | 0.31 | 0.24 |

| Hours | 95.0% CFCl=CF$_2$ 5.0% CH$_2$=CF$_2$ | 65.6% CFCl=CF$_2$ 34.4% CH$_2$=CF$_2$ | 43.5% CFCl=CF$_2$ 56.5% CH$_2$=CF$_2$ | Homopolymer |
|---|---|---|---|---|
| 70 | 0.21 | 0.99 | 0.12 | 0.03 |
| 140 | 0.24 | 1.01 | 0.12 | 0.03 |
| 447 | 0.25 | 1.06 | 0.12 | 0.03 |
| 495 | 0.26 | 1.08 | 0.13 | 0.03 |
| 567 | 0.27 | 1.10 | 0.14 | 0.03 |
| 638 | 0.27 | 1.10 | 0.14 | 0.03 |
| 1,092 | 0.27 | 1.19 | 0.14 | 0.03 |

Table VIII
PERCENT WEIGHT LOSS AT 175° C.

| Hours | 99.0% CFCl=CF$_2$ 1.0% CH$_2$=CF$_2$ | 98.0% CFCl=CF$_2$ 2.0% CH$_2$=CF$_2$ | 97.0% CFCl=CF$_2$ 3.0% CH$_2$=CF$_2$ | 96.0% CFCl=CF$_2$ 4.0% CH$_2$=CF$_2$ |
|---|---|---|---|---|
| 64 | 0.20 | 0.28 | 0.28 | 0.26 |
| 329 | 0.23 | 0.32 | 0.30 | 0.26 |
| 470 | 0.23 | 0.32 | 0.32 | 0.28 |
| 637 | 0.23 | 0.32 | 0.32 | 0.28 |
| 895 | 0.23 | 0.32 | 0.32 | 0.28 |

| Hours | 95.0% CFCl=CF$_2$ 5.0% CH$_2$=CF$_2$ | 65.6% CFCl=CF$_2$ 34.4% CH$_2$=CF$_2$ | 43.5% CFCl=CF$_2$ 56.5% CH$_2$=CF$_2$ | Homopolymer |
|---|---|---|---|---|
| 64 | 0.91 | 0.97 | 0.16 | 0.12 |
| 329 | 0.94 | 1.00 | 0.16 | 0.12 |
| 470 | 0.97 | 1.03 | 0.16 | 0.12 |
| 637 | 0.97 | 1.03 | 0.16 | 0.12 |
| 895 | 1.00 | 1.03 | 0.16 | 0.12 |

Table IX
PERCENT WEIGHT LOSS AT 150° C.

| Hours | 99.0% CFCl=CF$_2$ 1.0% CH$_2$=CF$_2$ | 98.0% CFCl=CF$_2$ 2.0% CH$_2$=CF$_2$ | 97.0% CFCl=CF$_2$ 3.0% CH$_2$=CF$_2$ | 96.0% CFCl=CF$_2$ 4.0% CH$_2$=CF$_2$ |
|---|---|---|---|---|
| 65 | 0.13 | 0.09 | 0.19 | 0.21 |
| 333 | 0.17 | 0.19 | 0.26 | 0.21 |
| 472 | 0.20 | 0.22 | 0.27 | 0.26 |
| 616 | 0.20 | 0.22 | 0.29 | 0.27 |
| 873 | 0.20 | 0.22 | 0.29 | 0.27 |

| Hours | 95.0% CFCl=CF$_2$ 5.0% CH$_2$=CF$_2$ | 65.6% CFCl=CF$_2$ 34.4% CH$_2$=CF$_2$ | 43.5% CFCl=CF$_2$ 56.5% CH$_2$=CF$_2$ | Homopolymer |
|---|---|---|---|---|
| 65 | 0.81 | 0.89 | 0.05 | 0.06 |
| 333 | 0.92 | 0.95 | 0.05 | 0.08 |
| 472 | 0.94 | 0.95 | 0.06 | 0.08 |
| 616 | 0.94 | 0.95 | 0.06 | 0.08 |
| 873 | 0.95 | 0.95 | 0.06 | 0.08 |

According to Table X copolymers containing 2, 4, 5, 34.4 and 56.5 mol per cent of vinylidene fluoride were tested in selected solvents at 80° C. for seven days. The gauge of chemical stability is the change in weight.

Table X
PERCENT INCREASE IN WEIGHT

| Solvent | 98% CClF=CF$_2$ 2% CH$_2$=CF$_2$ | 96% CClF=CF$_2$ 4% CH$_2$=CF$_2$ | 95% CClF=CF$_2$ 5% CH$_2$=CF$_2$ | 65.6% CClF=CF$_2$ 34.4% CH$_2$=CF$_2$ | 43.5% CClF=CF$_2$ 56.5% CH$_2$=CF$_2$ |
|---|---|---|---|---|---|
| Heptane | 2.5 | 3.9 | 3.5 | 13.2 | 10.5 |
| Toluene | 8.6 | 8.5 | 16.7 | 72.8 | 65.8 |
| Methyl Ethyl Ketone | 6.2 | 10.0 | 12.7 | Dissolved | Dissolved |
| White Fuming Nitric Acid | 0.5 | 0.7 | 0.8 | 12.2 | 20.0 |
| Dichromate Solution | | | −0.2 | −0.3 | |
| 10% KOH | 0.1 | 0.2 | 0.5 | −0.1 | 0.1 |
| Alcoholic KOH (10%) | | | −0.6 | −32.9 | −38.3 |
| Ethyl Acetate | 8.9 | 16.1 | 20.0 | Dissolved | Dissolved |

Table XI

The NST values of the various copolymers of trifluorochloroethylene and vinylidene fluoride were determined to be as follows:

| Mol Percent | | NST, °C. |
|---|---|---|
| Percent CClF=CF$_2$ | Percent CH$_2$=CF$_2$ | |
| 99.0 | 1.0 | 306 |
| 98.0 | 2.0 | 306 |
| 97.0 | 3.0 | 293 |
| 96.0 | 4.0 | 321 |
| 95.0 | 5.0 | 334 |
| 65.6 | 34.4 | 320 |
| 43.5 | 56.5 | 324 |

EXAMPLE VI

The following tables show a comparative relationship between a copolymer of trifluorochloroethylene containing about 2 mol per cent of vinylidene fluoride:

Table XII

POWER FACTOR (CYCLES)

| | 100 | 1,000 | 10,000 | 100,000 | 1,000,000 | 3,500,000 |
|---|---|---|---|---|---|---|
| 322 NST Copolymer (2 mol percent vinylidene fluoride) | 0.0191 | 0.0274 | 0.0273 | 0.0178 | 0.0122 | 0.0118 |
| 328 NST Copolymer (2 mol percent vinylidene fluoride) | 0.0195 | 0.0271 | 0.0264 | 0.0164 | 0.0125 | 0.0121 |
| 317 NST Homopolymer | 0.0196 | 0.0265 | 0.0238 | 0.0132 | 0.00924 | 0.000897 |

Table XIII

DIELECTRIC CONSTANT (CYCLES)

| | 100 | 1,000 | 10,000 | 100,000 | 1,000,000 | 3,500,000 |
|---|---|---|---|---|---|---|
| 322 NST Copolymer (2 mol percent vinylidene fluoride) | 2.86 | 2.76 | 2.64 | 2.56 | 2.50 | 2.57 |
| 328 NST Copolymer (2 mol percent vinylidene fluoride) | 2.77 | 2.68 | 2.57 | 2.49 | 2.43 | 2.50 |
| 317 NST Homopolymer | 2.75 | 2.66 | 2.55 | 2.48 | 2.44 | 2.51 |

Table XIV

DIELECTRIC STRENGTH SPECIMENS 15 TO 20 MILS THICK

| | Volts/mil |
|---|---|
| 322 N. S. T. copolymer (2 mol percent vinylidene fluoride) | 1170 |
| 328 N. S. T. copolymer (2 mol percent vinylidene fluoride) | 1040 |
| 317 N. S. T. Homopolymer | 1170 |

Table XV

VISCOSITY CHANGE ON HEAT AGING—3 MONTHS

| Original NST, °C. | Viscosity, Centistokes | Viscosity, Centistokes, 150° C. | Viscosity, Centistokes, 190° C. | Corresponding NST (190° C.) |
|---|---|---|---|---|
| Homopolymer: | | | | |
| 307 | 2.33 | 2.24 | 2.18 | 302 |
| 300 | 2.20 | | 1.91 | 289 |
| 284 | 1.77 | 1.79 | 1.65 | 270 |
| 264 | 1.58 | 1.63 | 1.24 | 228 |
| 223 | 1.17 | 1.18 | 1.02 | 220 |
| Copolymer (2 mol percent vinylidene fluoride): | | | | |
| 322 | 2.48 | 2.37 | 2.22 | 322 |
| 290 | 2.40 | | 2.92 | 290 |

As the result of the comparative data, the following conclusions may be drawn. Under given conditions the copolymer flows more readily and requires a shorter fusion time. Low N. S. T. copolymers, i. e., copolymers having N. S. T. below 250° C. (minimum 210° C. N. S. T.) do not become brittle on heat aging at 190° C. over a three months period. Films of corresponding thickness of copolymer, as compared with the homopolymer, are greater and more transparent. The copolymer and homopolymer exhibit only minor differences in swelling by chemicals, weight loss due to aging and electrical properties.

In general, the polymers and copolymers of the examples were prepared at comparable polymerization conditions and at temperatures below 15° C. or 20° C. in the presence of a peroxy compound as a promoter for a period of time not longer than about 7 or 8 days. At these conditions reproducible results and suitable yields were assured. The general discussion as to the operating conditions and promoters applies to the various polymers and copolymers of the examples.

The most probable theory for the superiority of the copolymers containing small amounts of vinylidene fluoride is that the commoner vinylidene fluoride upsets the symmetry of the molecule, thus decreasing crystallinity of the solid product, without substantially altering other physical properties of the copolymer due to the major component of the copolymer.

Having described our invention, we claim:

1. A thermoplastic copolymer consisting essentially of trifluorochloroethylene containing between 0.5 and 6 mol per cent vinylidene fluoride.

2. A thermoplastic copolymer consisting essentially of trifluorochloroethylene containing between 1 and 4 mol per cent of vinylidene fluoride having an N. S. T. above about 210° C.

3. A copolymer of trifluorochloroethylene and vinylidene fluoride prepared by copolymerizing trifluorochloroethylene and between 0.5 and 6 mol per cent vinylidene fluoride as substantially the sole monomers at a temperature between about —17° C. and about 25° C. for a period of time between about 30 minutes and about 12 days.

4. An article of manufacture which comprises a metallic wire coated with a continuous film of a copolymer consisting essentially of trifluorochloroethylene and between 1 and 4 mol per cent vinylidene fluoride having an N. S. T. between about 240 and about 340.

5. An article of manufacture which comprises a metal surface coated with a film of a copolymer consisting essentially of trifluorochloroethylene and between 0.1 and about 6 mol per cent vinylidene fluoride.

6. A copolymer consisting essentially of trifluorochloroethylene and between 1 and 4 mol per cent vinylidene fluoride.

7. A method for preparing a copolymer of trifluorochloroethylene and vinylidene fluoride which comprises admixing trifluorochloroethylene and between 0.5 and 6 mol per cent vinylidene fluoride as substantially the sole monomers, polymerizing the mixture at a temperature of about 0° C. and about 30° C. in the presence of an aqueous suspension medium and an inorganic water-soluble peroxy compound as a promoter for a period of time between about 30 minutes and 12 days such that a thermoplastic copolymer is produced and recovering the thermoplastic copolymer having an N. S. T. value between about 210° C. and about 350° C.

8. A copolymer consisting essentially of trifluorochloroethylene and between 0.1 and 6 mol per cent of vinylidene fluoride.

References Cited in the file of this patent

UNITED STATES PATENTS

| | | |
|---|---|---|
| 2,468,054 | Ford | Apr. 26, 1949 |
| 2,478,229 | Berry | Aug. 9, 1949 |
| 2,479,367 | Joyce et al. | Aug. 6, 1949 |
| 2,531,134 | Kropa | Nov. 21, 1950 |
| 2,549,935 | Sauer | Apr. 24, 1951 |
| 2,599,640 | Joyce | June 10, 1952 |
| 2,631,998 | Pearson | Mar. 17, 1953 |